United States Patent [19]

Giraud

[11] Patent Number: 4,581,890
[45] Date of Patent: Apr. 15, 1986

[54] DOUBLE FLOW TURBINE ENGINE EQUIPPED WITH A CENTRAL MIXING NOZZLE AND A THRUST REVERSE

[76] Inventor: Pierre Giraud, 45, rue de Lisbonne, 75008 Paris, France

[21] Appl. No.: 724,043

[22] Filed: Apr. 18, 1985

Related U.S. Application Data

[63] Continuation of Ser. No. 558,876, Dec. 7, 1983, abandoned.

[30] Foreign Application Priority Data

May 27, 1983 [FR] France ............................... 83 08819

[51] Int. Cl.⁴ ................................................ F02K 1/38
[52] U.S. Cl. ........................................ 60/230; 60/262; 239/265.29
[58] Field of Search ............. 60/262, 264, 232, 226.2, 60/230; 239/265.17, 265.29; 181/215, 220

[56] References Cited

U.S. PATENT DOCUMENTS

| 2,968,150 | 1/1961 | Goebel et al. | 181/215 X |
| 2,980,199 | 4/1961 | Keen | 181/215 |
| 3,196,608 | 7/1965 | Tindale | 60/262 |
| 3,568,792 | 3/1971 | Urquhart | 181/215 |
| 3,650,472 | 3/1972 | Tontini et al. | 181/215 |
| 3,696,617 | 10/1972 | Ellis | 60/262 X |
| 3,737,005 | 6/1973 | Tontini | 181/216 |
| 4,292,803 | 10/1981 | Prior | 60/262 X |
| 4,362,015 | 12/1982 | Fage | 60/262 X |

Primary Examiner—Carlton R. Croyle
Assistant Examiner—Donald E. Stout
Attorney, Agent, or Firm—Fisher, Christen and Sabol

[57] ABSTRACT

The present invention relates to a turbine engine which is provided with a thrust reverser incorporating doors and which is of double flow type with mixing of said flows, i.e. comprising a central generator emitting a flow of hot gas and surrounded by an annular by-pass conduit through which passes a flow of relatively cold gas, said central generator being provided with a hot flow exhaust nozzle comprising means for mixing said hot and cold flows. According to the invention, the turbine engine comprises controllable means for inhibiting, at least partially, the means for mixing the flows.

3 Claims, 4 Drawing Figures

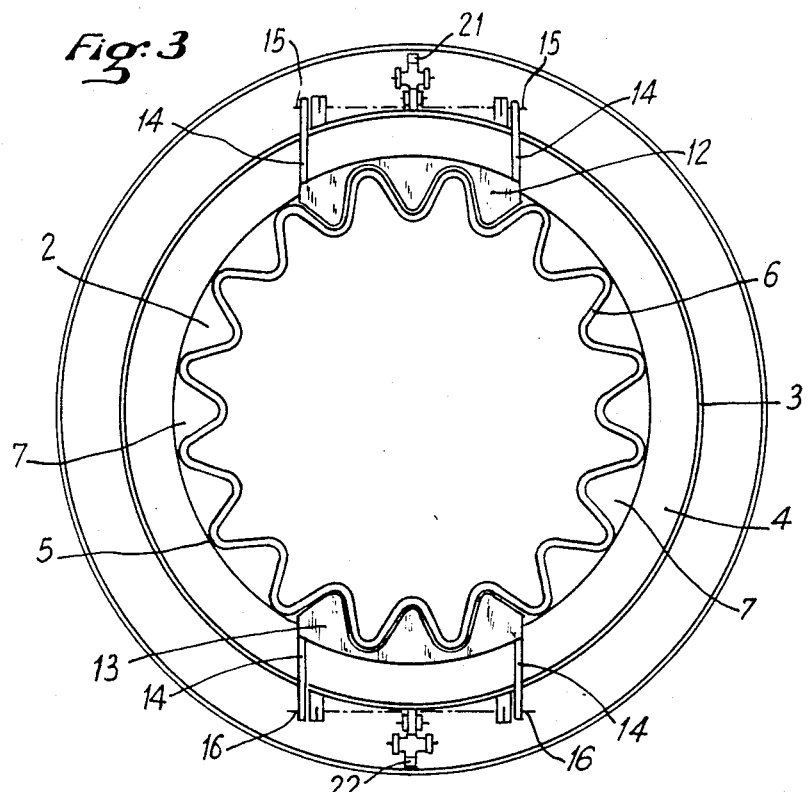
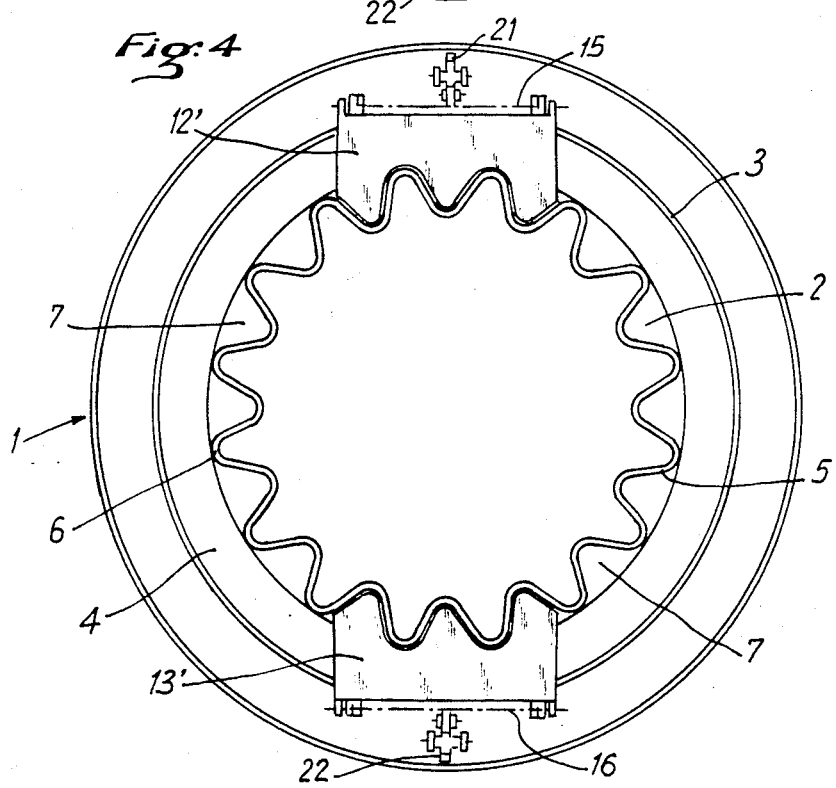

DOUBLE FLOW TURBINE ENGINE EQUIPPED WITH A CENTRAL MIXING NOZZLE AND A THRUST REVERSE

This application is a continuation of application Ser. No. 558,876, filed Dec. 7, 1983, now abandoned.

The present invention relates to a double-flow turbine engine equipped with a central mixing nozzle and a thrust reverser incorporating doors.

Turbine engines of this type are known to comprise a central generator emitting a flow of hot gas and an annular by-pass circuit surrounding said central generator and through which a by-pass flow of relatively cold gas passes, the exhaust nozzle of said central generator being provided with means for mixing said hot and cold flows. At the present time, such turbine engines are tending to be more and more widely used, as the central mixing nozzle increases the performances of the associated engine, reduces the specific fuel consumption thereof and substantially reduces the noise made by said engine.

Of course, the effect of the central nozzle mixing the cold and hot gases is that the temperature of the flow of hot gas is lowered; however, the mean temperature of the mixed flows generally remains high, at least in certain zones, and the thrust reverser must be constructed with materials withstanding high temperature, which are therefore heavy.

It is an object of the present invention to overcome this drawback and to make the thrust reverser, associated with a turbine engine incorporating a central flow mixing nozzle, with light materials which resist low or moderate temperatures, such as aluminium alloys or composite materials based on resistant fibres.

To this end, according to the invention, the turbine engine which is provided with a thrust reverser incorporating doors and which is of double flow type with mixing of said flows, i.e. comprising a central generator emitting a flow of hot gas and surrounded by an annular by-pass conduit through which passes a flow of relatively cold gas, said central generator being provided with a hot flow exhaust nozzle comprising means for mixing said hot and cold flows, is noteworthy in that it comprises controllable means for inhibiting, at least partially, the means for mixing the flows.

In fact, applicant has observed experimentally that the maximum temperature attained on the extended doors of the thrust reverser could be considerably lowered if the efficiency of the flow mixing means were momentarily reduced. It will be noted that this reduction in efficiency is not detrimental during the phase of operation of the engine during which the reverser is used, since this phase lasts only a short time and corresponds to the braking of the aircraft on which said turbine engine is mounted.

Applicant assumes that, by inhibiting at least partially the process of mixing the hot and cold flows during extension of the doors of the thrust reverser, the cold by-pass flow comes into contact with the structure of the reverser, with the result that the latter is maintained at a sufficiently low temperature to enable light materials to be used for constructing said reverser. Of course, the above explanation of the phenomenon has only been assumed and it is given only to enable the phenomenon to be more readily understood, without the fact of its being correct or incorrect having any influence on the protection of the present invention.

The control of said inhibiting means is preferably coupled with that of the doors of the reverser.

If the means for mixing the hot and cold flows are constituted, in known manner, by convolutions made on the periphery of the exhaust nozzle of the central generator and forming between each pair of them a channel for guiding the gas of the cold flow towards the hot flow, it is advantageous if said inhibiting means are constituted by mobile obstacles adapted to obturate at least certain of said channels. These inhibiting means may be constituted by transverse flaps pivoted about pins disposed in said annular by-pass conduit and whose shape corresponds to the section of said channels.

The pivot pins of the flaps preferably lie in the annular by-pass conduit, adjacent the radially outward surface thereof (i.e. as far as possible from the hot flow generator) and said flaps are in cantilever support about said pins. The latter may be connected to a control linkage which cooperates with the doors of the reverser so that, when the doors are in retracted position, the flaps take a retracted position in the annular by-pass conduit and, when said doors are in extended position, these flaps obturate the channels formed between the convolutions of the nozzle.

The dimensions of said flaps may be just sufficient to obturate said channels. In a variant embodiment, the flaps may present such dimensions that they not only obturate the corresponding channels, but they restrict the passage of the cold flow in said annular by-pass conduit, when the doors of the thrust reverser are extended. In that case, advantage is taken, in combination with the process forming the subject matter of the present invention, of the effect of temperature reduction described in U.S. Pat. No. 4,362,015.

The invention will be more readily understood on reading the following description with reference to the accompanying drawings, in which:

FIG. 3 is a section in the outlet plane of the nozzle of the turbine engine according to the invention, corresponding to arrow III in FIG. 2.

FIG. 4 is a view similar to that of FIG. 3, illustrating a variant embodiment of the invention.

In these Figures, like references designate like elements.

Figure 1:
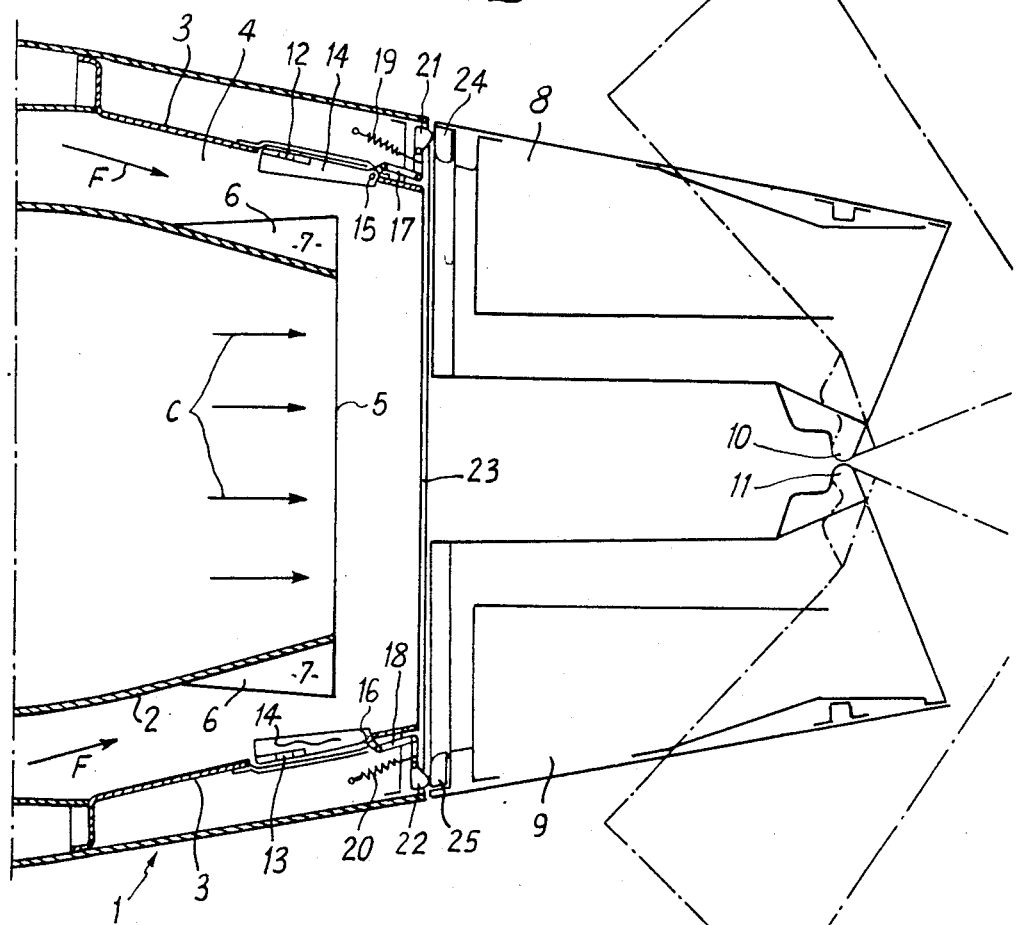
FIG. 1 is a schematic view in section of the rear part of a turbine engine according to the invention, the flaps being in retracted position.
Figure 2:
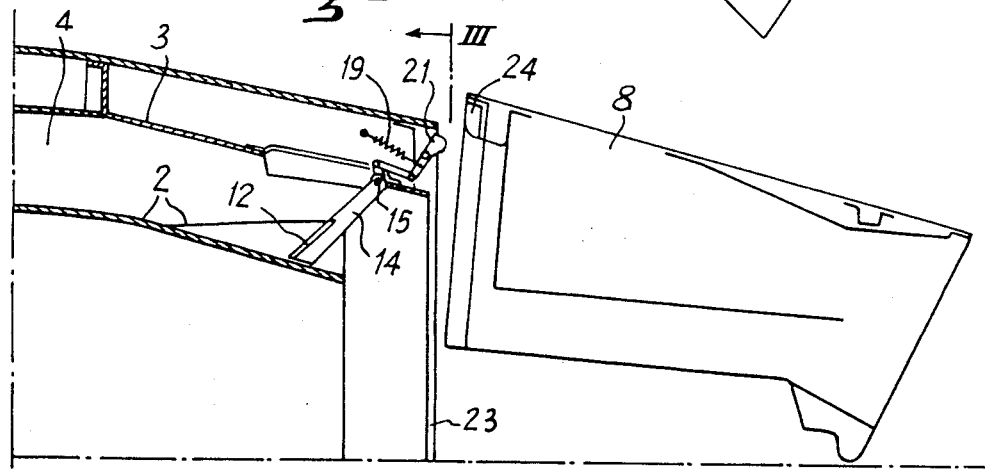
FIG. 2 is a half-section corresponding to FIG. 1, the flaps being in a position restricting the passage of a cold gas.

Referring now to the drawings, the turbine engine 1 according to the invention, whose rear part is shown schematically in section in FIGS. 1 to 3, comprises a central hot gas generator 2, surrounded by a peripheral wall 3 so that, between said wall and said generator 2, there is formed an annular by-pass conduit 4 for the passage of a by-pass flow of relatively cold gas.

The exhaust nozzle 5 for the hot flow generated by generator 2 comprises on its periphery a plurality of convolutions 6 defining therebetween channels 7 adapted to guide part of the cold flow (arrows F) towards the hot flow (arrows C), so that these two flows are mixed downstream of said nozzle 5.

At the rear of the turbine engine 1, a thrust reverser is provided, comprising two doors 8 and 9 which are pivoted about transverse pins 10 and 11 respectively. In retracted position (in solid lines in FIG. 1), doors 8 and 9 form an extension of the turbine engine 1, whilst, in extended position (an intermediate extended position is shown in chain-dotted lines in FIG. 1), they are disposed transversely with respect to the flows of gas leaving the turbine engine.

To obtain the effect of the invention mentioned above, enabling doors 8 and 9 to be constructed of light alloy, for example, flaps are provided of which only two, designated 12 and 13, have been shown in the Figures, and which are adapted to obturate at least some of channels 7.

Each flap 12 or 13 is borne at the end of lateral arms 14. The two arms 14 associated with flap 12 are pivoted by their ends remote from the flap 12 about a transverse pin having an axis 15 located adjacent wall 3, which forms the radially outward surface of the annular by-pass conduit 4. Similarly, the two arms 14 associated with flap 13 are pivoted by their ends remote from the flap 13, about a transverse pin having an axis 16 which is located adjacent wall 3. In this way, the flaps 12 and 13 are carried in cantilever support by the arms 14 about their respective axes 15 and 16. Each flap presents a shape corresponding to the cross-section of one or more adjacent channels 7.

A linkage 17 or 18, biased by a spring 19 or 20 respectively, is connected to its associated flap 12 or 13. Each of the linkages 17 and 18 possesses a pivoting lever comprising at its free end a cam 21 or 22 respectively, capable of projecting outside the outlet plane 23 of the turbine engine and of cooperating with a cam 24 or 25 formed on the front edge of door 8 or 9 respectively.

The action of springs 19 and 20 tends to cause cams 21 and 22 to project outside the plane 23 and flaps 12 and 13 to pivot, so that the latter obstruct the corresponding channels 7, their lower edge coming into contact with the wall of the generator 2.

In this way, when doors 8 and 9 of the reverser are extended (cf. FIGS. 2 and 3), the cams 21 and 22 project with respect to plane 23, whilst flaps 12 and 13 obstruct channels 7 and therefore make the process of mixing the hot and cold flows less effective.

On the other hand, when doors 8 and 9 of the reverser are closed (cf. FIG. 1), the cams 24 and 25 formed thereon coact with cams 21 and 22 and, via linkages 17 and 18 and against the biases of springs 19 and 20, cause the flasps 12 and 13 to pivot and retract into housings in the wall 3 in order to clear conduit 4 completely.

In this way, when doors 8 and 9 of the reverser are extended, mixing of the hot and cold flows is at least partially inhibited. As indicated above, this results in a reduction of the temperature on doors 8 and 9. This temperature may be adjusted by regulating the number and/or the dimensions of flaps 12 or 13.

Of course, when flaps 12 and 13 obturate channels 7, the performance of the turbine engine 1 is reduced but such reduction in performance is acceptable since it is temporary and occurs only at particular periods of flight of the aircraft which do not require optimal performance.

It will be noted that the position of obstruction (FIG. 2) of the flaps is particularly stable, since, in that case, said flaps, which are inclined forwardly, are pressed by the cold jet so that their front edge abuts against the generator.

In the embodiment shown in FIGS. 1 to 3, with the doors 8 and 9 in extended position, the flaps 12 and 13 obturate only channels 7, only the arms 14 passing through the annular conduit 4.

In the variant embodiment shown in FIG. 4, flaps 12' and 13' have been provided, capable of obturating not only channels 7, but also part of the by-pass conduit 4. In addition to the effect produced by the present invention, the effect of lowering of temperature described in U.S. Pat. No. 4,362,015 due to the restriction of said conduit 4 is then obtained. These two effects combine to reduce the temperatures imposed on doors 8 and 9.

What is claimed is:

1. In a by-pass gas turbine engine comprising:
    a central generator including a central jet exhaust pipe having an exit end adapted to emit a first jet of relatively hot gas;
    an annular by-pass conduit surrounding said central jet exhaust pipe, said by-pass conduit having an exit end adapted to emit a second annular jet of relatively cold gas enveloping said first jet of relatively hot gas;
    means for mixing said first and second jets, said mixing means being constituted by convolutions made on said exit end of said central jet exhaust pipe and channels for guiding said second jet towards said first jet being formed between said convolutions, the convolutions being arranged such that the channels extend radially inwardly into the exit end of the jet exhaust pipe and lie radially inwardly of the annular by-pass conduit; and
    a thrust reverser located downstream of the exit ends of said central jet exhaust pipe and said by-pass conduit, said thrust reverser comprising doors movable between a folded position in which said doors are clear of said first and second jets and an unfolded position in which said doors are disposed transversely in the path of said jets,
    the improvement comprising: obturating means capable of extending into at least one of the channels of said mixing means, thereby selectively obturating at least one of the cahnnels of the mixing means, the obturating means comprising transverse flaps pivotable about axes disposed in the annular by-pass conduit, the shape of the flaps corresponding to the cross-section of the channels and the flaps being arranged so as to obturate the channels without substantially reducing the cross-sectional are of the annular by-pass conduit, the obturating means and the thrust reverser being coupled in operation such that said at least one channel is obturated when said doors are unfolded.

2. A gas turbine engine in accordance with claim 1 wherein the axes of the transverse flaps lie in the annular by-pass conduit adjacent the radially outward surface thereof, and the flaps are pivoted in cantilever support about said axis.

3. A gas turbine engine in accordance with claim 1, wherein the axes of the flaps are connected to a control linkage which cooperates with the doors of the reverser, so that, when the doors are in folded position, the flaps assume a retracted position in the annular by-pass conduit and, when said doors are in unfolded position, these flaps obturate the channels formed between the convolutions of the nozzle.

* * * * *